(12) United States Patent
Tsai

(10) Patent No.: US 12,510,763 B2
(45) Date of Patent: Dec. 30, 2025

(54) IMAGE GENERATING MODULE AND FLOATING IMAGE GENERATION DEVICE

(71) Applicant: Darwin Precisions Corporation, Hsinchu County (TW)

(72) Inventor: Jung-Chih Tsai, Hsinchu County (TW)

(73) Assignee: Darwin Precisions Corporation, Hsinchu County (TW)

(*) Notice: Subject to any disclaimer, the term of this patent is extended or adjusted under 35 U.S.C. 154(b) by 388 days.

(21) Appl. No.: 18/205,073

(22) Filed: Jun. 2, 2023

(65) Prior Publication Data

US 2023/0418088 A1 Dec. 28, 2023

(30) Foreign Application Priority Data

Jun. 28, 2022 (TW) .................................. 111124112

(51) Int. Cl.
*G02B 30/56* (2020.01)
(52) U.S. Cl.
CPC .................................... *G02B 30/56* (2020.01)
(58) Field of Classification Search
CPC ...................................................... G02B 30/56
See application file for complete search history.

(56) References Cited

U.S. PATENT DOCUMENTS 9,097,904 B2 * 8/2015 Wang ................... H04N 13/307

FOREIGN PATENT DOCUMENTS

TW I477815 B 3/2015

* cited by examiner

*Primary Examiner* — Ryan D Howard
(74) *Attorney, Agent, or Firm* — WPAT, PC

(57) ABSTRACT

An image generating module and a floating image generation device are disclosed. The image generating module includes an image generation unit and a floating image generation unit. The floating image generation unit having a light axis is disposed parallelly on one side of the image generation unit and includes a light receiving surface and a light emitting surface disposed opposite to each other. The light receiving surface faces the image generation unit. The image generation unit provided an output light for generating a real image outside the light emitting surface. The absolute value of the radius of curvature of the light receiving surface at a position close to the light axis is smaller than the absolute value of the radius of curvature of the light emitting surface at a position close to the light axis. The floating image generation device includes a light source and the image generating module. The floating image generation unit is disposed parallelly on the opposite side of the image generation unit with respect to the light source. The light emitted by the light source passes through the image generation unit to generate a real image.

14 Claims, 6 Drawing Sheets

IMAGE GENERATING MODULE AND FLOATING IMAGE GENERATION DEVICE

CROSS-REFERENCE TO RELATED APPLICATION

This application claims the priority benefit of Taiwan application Ser. No. 111124112 filed on Jun. 28, 2022. The entirety of the above-mentioned patent applications is hereby incorporated by reference herein and made a part of this specification.

BACKGROUND

Technical Field

The present disclosure relates to an image generating module and a floating image generation device.

Related Art

With the progress of the technology, display techniques continuously evolve to satisfy users' requirement of greater visual experience. In the field of three-dimensional display techniques, 3D glasses and naked-eye 3D display techniques are commonly used. With naked-eye 3D display technique, users can see 3D images directly without wearing any device. With 3D display technique using glasses, users have to see 3D image by wearing glasses having polarized lens, shutter lens, etc. Naked-eye 3D display technique is popular among customers due to its convenience and comfort, wherein floating image generation technique attracts customer's attention especially. One feature of floating image generation technique is the capability to project floating images in space, wherein floating images not only can be seen but also can have interaction with customers at close range.

In general, floating image displaying devices project images in space via image generation modules. However, for conventional image generation devices, the field-of-view angle is around 59°, i.e. the projected images are visible merely in the range of 59° with respect to the light axis of the image generation device. In other words, if the eyes of a user are located in a range which is out of the range of 59° with respect to the light axis (often overlapped with a central axis) of the floating image displaying device, the user might not be able to see the floating images clearly. As such, conventional floating image generation devices are still improvable.

SUMMARY

One of objectives of the present disclosure is to provide an image generating module and a floating image generation device having greater field-of-view angle.

The image generating module includes an image generation unit and a floating image generation unit having a light axis disposed parallelly on one side of the image generation unit. The floating image generation unit includes a light receiving surface and a light emitting surface disposed opposite to each other. The light receiving surface faces the image generation unit. The image generation unit provides an output light for generating a real image outside the light emitting surface. The absolute value of the radius of curvature of the light receiving surface at a position close to the light axis is smaller than the absolute value of the radius of curvature of the light emitting surface at a position close to the light axis.

The floating image generation device of the present disclosure includes a light source and the image generating module. The floating image generation unit is disposed parallelly on the side of the image generation unit opposite to the light source, wherein the light emitted by the light source passes through the image generation unit to form the output light for generating the real image.

DETAILED DESCRIPTION

Figure 1A:
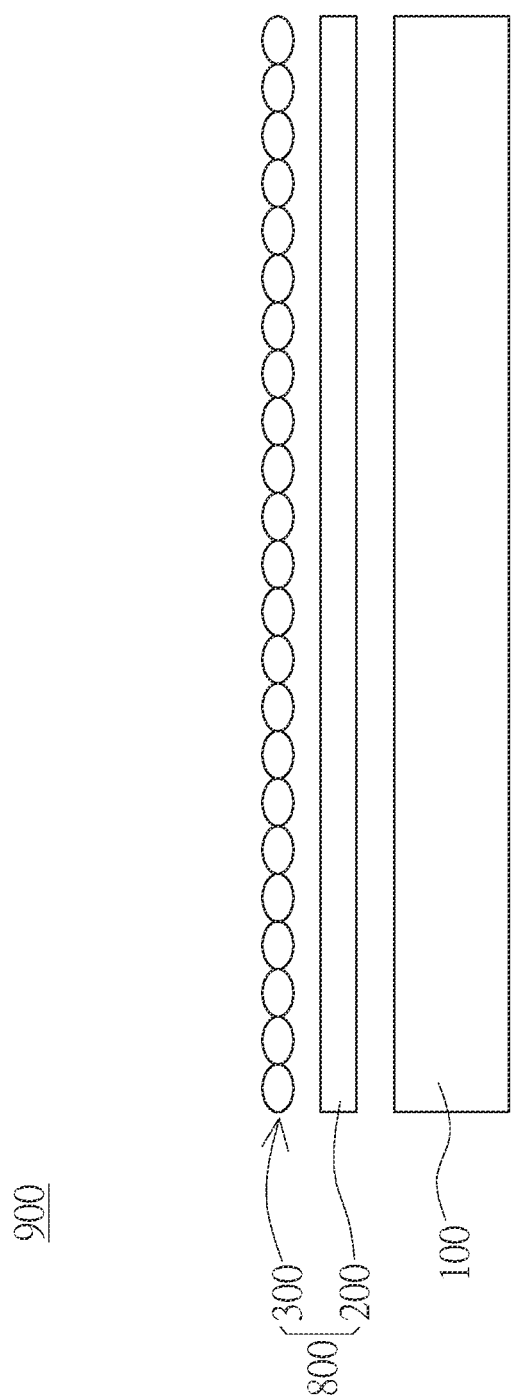
FIG. 1A is a schematic diagram of an embodiment of an image generating module according to the present disclosure.

Implementations of a connection assembly disclosed by the present disclosure are described below by using particular and specific embodiments with reference to the drawings, and a person skilled in the art may learn of advantages and effects of the present disclosure from the disclosure of this specification. However, the following disclosure is not intended to limit the protection scope of the present disclosure, and a person skilled in the art may carry out the present disclosure by using other different embodiments based on different viewpoints without departing from the concept and spirit of the present disclosure. In the accompanying drawings, plate thicknesses of layers, films, panels, regions, and the like are enlarged for clarity. Throughout the specification, same reference numerals indicate same elements. It should be understood that when an element such as a layer, film, region or substrate is referred to as being "on" or "connected" to another element, it may be directly on or connected to the another element, or intervening elements may also be present. In contrast, when an element is referred to as being "directly on" or "directly connected to" another element, there is no intervening element present. As used herein, "connection" may refer to a physical and/or electrical connection. Further, "electrical connecting" or "coupling" may indicate that another element exists between two elements.

It should be noted that the terms "first", "second", "third", and the like that are used in the present disclosure can be used for describing various elements, components, regions, layers and/or portions, but the elements, components, regions, layers and/or portions are not limited by the terms. The terms are merely used to distinguish one element, component, region, layer, or portion from another element, component, region, layer, or portion. Therefore, the "first element", "component", "region", "layer", or "portion" discussed below may be referred to as a second element, component, region, layer, or portion without departing from the teaching of this disclosure.

In addition, relative terms, such as "down" or "bottom" and "up" or "top", are used to describe a relationship between an element and another element, as shown in the figures. It should be understood that the relative terms are intended to include different orientations of a device in addition to orientations shown in the figures. For example, if a device in a figure is turned over, an element that is described to be on a "lower" side of another element is directed to be on an "upper" side another element. Therefore, the exemplary terms "down" may include orientations of "down" and "up" and depends on a particular orientation of an accompanying drawing. Similarly, if a device in a figure is turned over, an element that is described as an element "below" another element or an element "below" is directed to be "above" another element. Therefore, the exemplary terms "below" or "below" may include orientations of up and down.

As used herein, "about", "approximately", or "substantially" is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, ±20%, ±10%, ±5% of the stated value. Further, as used herein, "about", "approximately", or "substantially" may depend on optical properties, etch properties, or other properties to select a more acceptable range of deviations or standard deviations without one standard deviation for all properties.

Figure 1B:
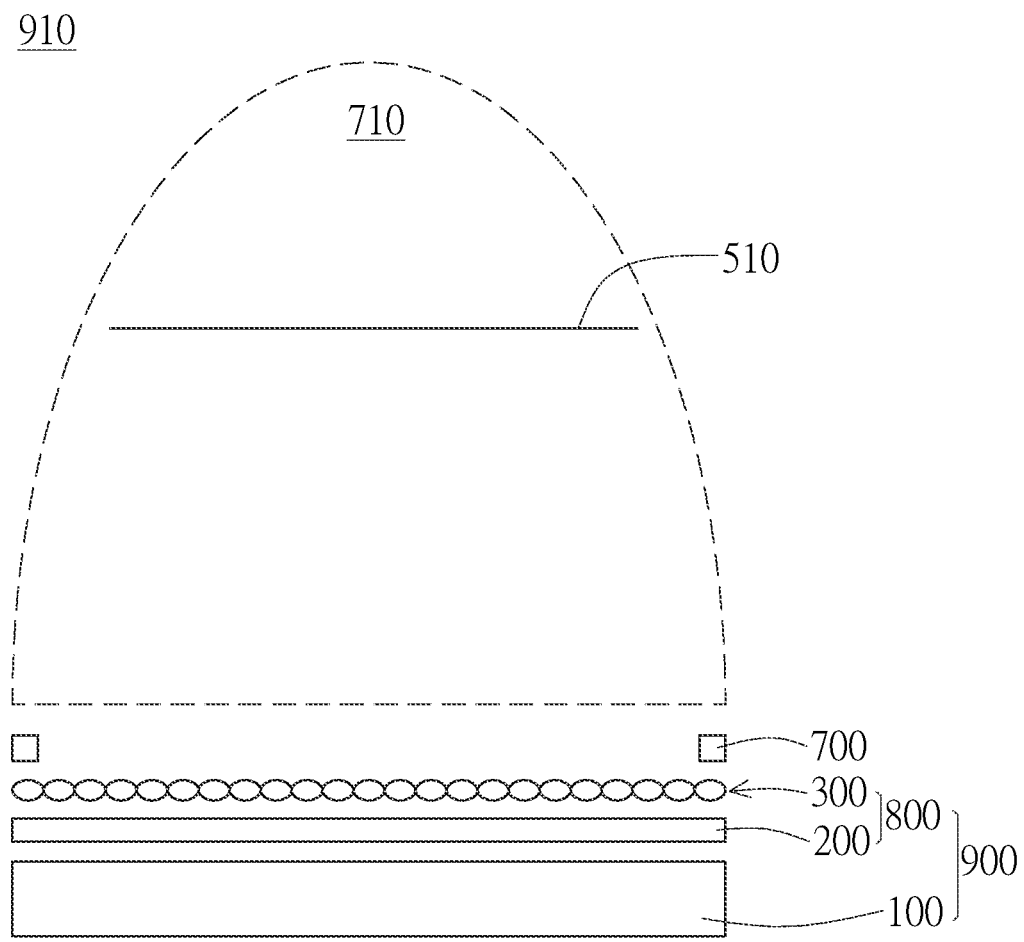
FIG. 1B is a schematic diagram of an embodiment of a floating image touch control device according to the present disclosure.

As shown in the embodiment in FIGS. 1A and 1B, the image generating module 800 of the present disclosure can form the floating image generation device 900 of the present disclosure with a light source 100. As shown in the embodiment in FIG. 1A, the floating image generation unit 300 is disposed parallelly on the side of the image generation unit 200 opposite to the light source 100. The light emitted by the light source 100 passes through the image generation unit 800 to generate a real image as a floating image. The floating image generation unit 300 can be a single lens or a microlens array, wherein the lens can include single-side or dual-side converging lens structures and can be formed by processes such as UV-imprinting, injection, heat-pressing, etc.

Specifically, as shown in the embodiment in FIG. 1B, the image generation unit 800 is capable of displaying a real image as a floating image on the side of the floating image generation unit 300 opposite to the light source 100. The image generation unit 800 can form a floating image touch control device 910 with the sensing module 400. When the sensing module 400 senses a touch motion in the sensing area 710, the image generated by the image generation unit 800 changes.

Figure 2:
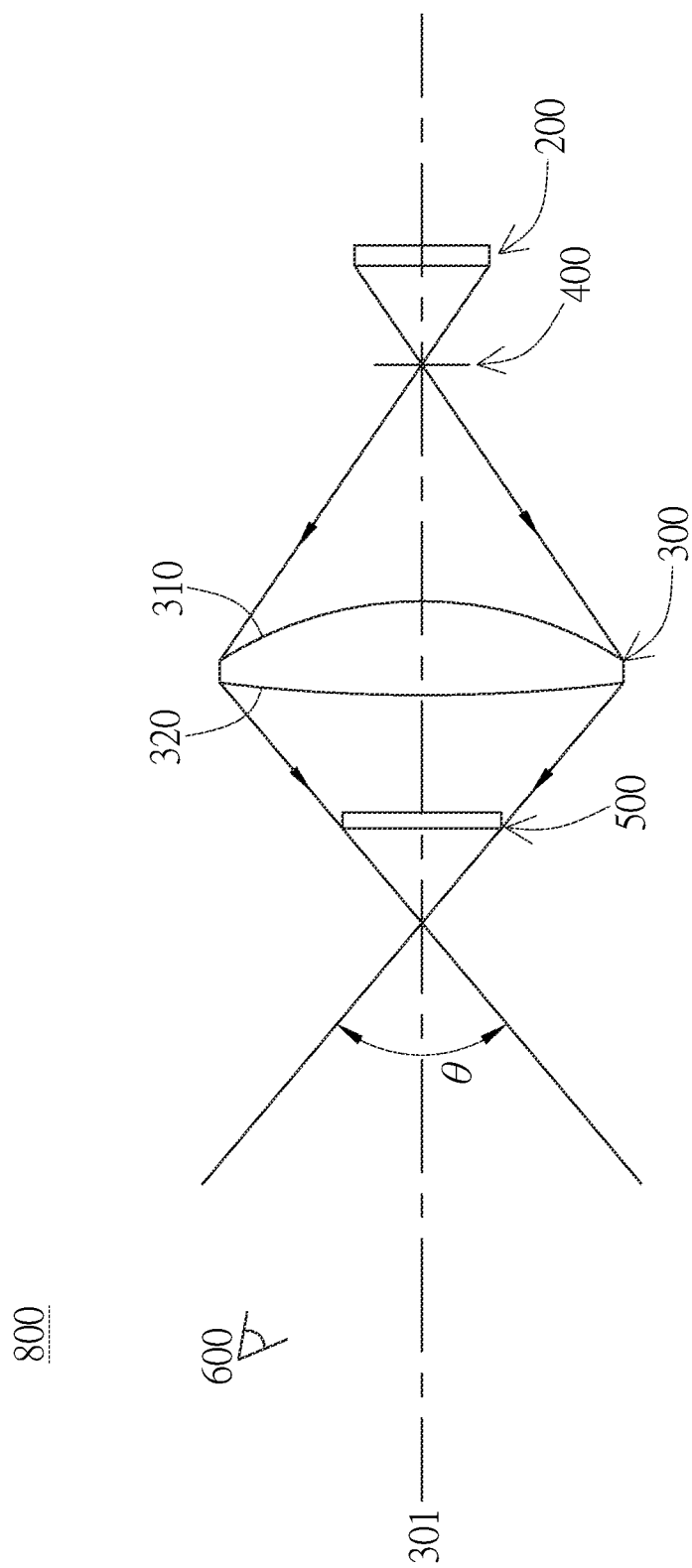
FIG. 2 is a schematic diagram of an embodiment of a floating image generation device according to the present disclosure.
Figure 3:
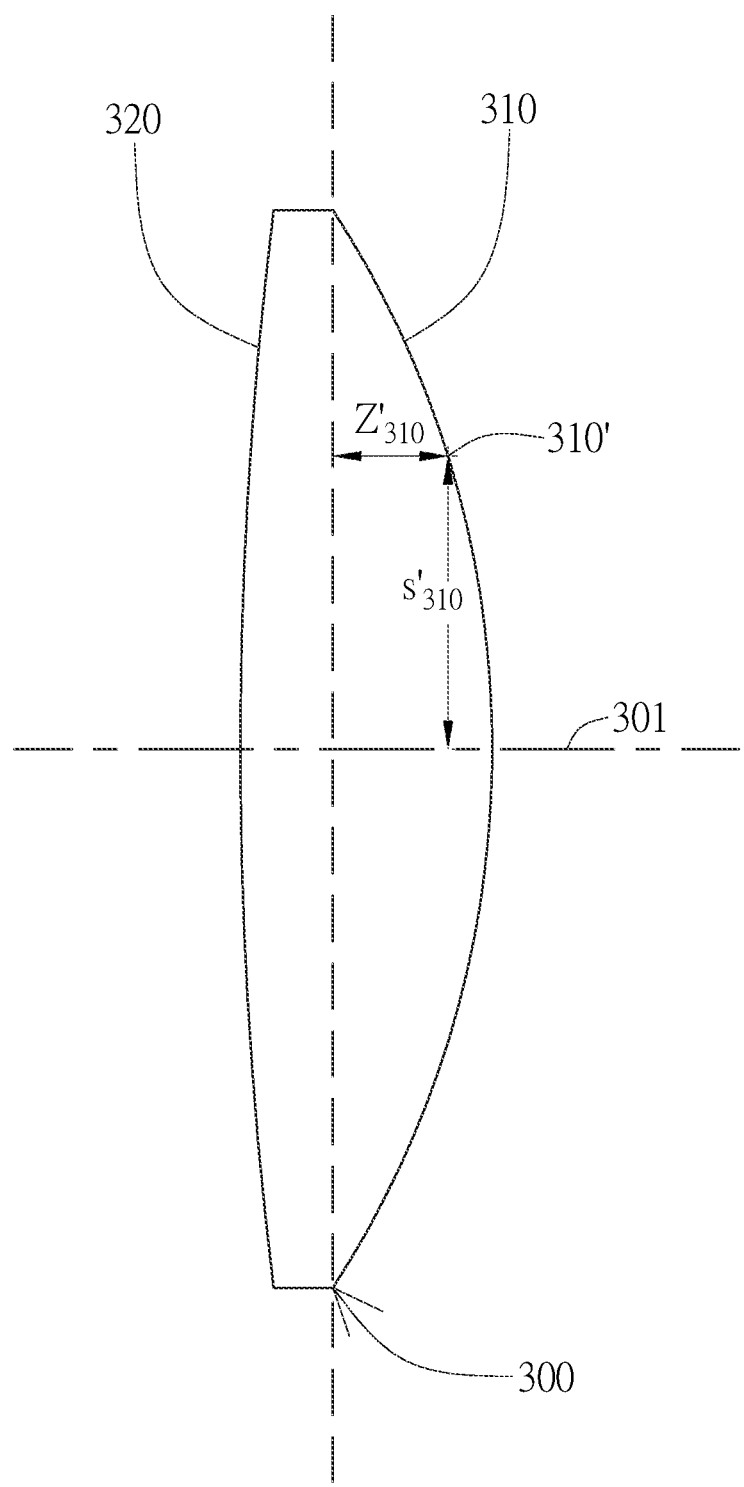
FIG. 3 is a schematic diagram of an embodiment of a floating image generation unit according to the present disclosure.

As shown in the embodiment in FIG. 2, the image generating module 800 includes an image forming unit 200 and a floating image generation unit 300. The image forming unit 200 contains the pattern of the desired floating image to be generated. More particularly, the pattern on the image forming unit 200 can block light. For example, the image forming unit 200 can be a negative film or a mask having fixed patterns. In different embodiments, the image forming unit 200 can be a liquid crystal display panel, an OLED display panel, or a plasma display panel, which have changeable patterns. The image forming unit 200 can also be a light emitting unit such as an LED. The floating image generation unit 300 is disposed parallelly on one side of the image generation unit 200. The image generating module 800 further includes an aperture diaphragm 400 disposed between the image generation unit 200 and the floating image generation unit 300.

As shown in the embodiment in FIG. 2, the floating image generation unit 300 has a light axis 301 and includes a light receiving surface 310 and a light emitting surface 320 disposed opposite to each other. The light receiving surface 310 faces the image generation unit 200, wherein the image generation unit 200 provides an output light for generating a real image 500 outside the light emitting surface 320. The absolute value of the radius of curvature of the light receiving surface 310 at a position close to the light axis 301 is smaller than the absolute value of the radius of curvature of the light emitting surface 320 at a position close to the light axis 301. In other words, the degree of bentness of the light receiving surface 310 is generally greater than the degree of bentness of the light emitting surface 320. Accordingly, the real image 500 is visible when it is outside the light emitting surface 320 and has a field-of-view angle θ more than or equal to 60° with respect to the light axis 301. In an embodiment, the real image 500 is visible when it is outside the light emitting surface 320 and has a field-of-view angle θ equal to 80° with respect to the light axis 301. In other words, the field-of-view angle of the image generating module 800 of the present disclosure can reach 80°, which provides a better user's experience.

More particularly, the light receiving surface 310 is represented by the following function:

$$Z_{310}(s_{310}) = \frac{C_{310}s_{310}^2}{1 + \sqrt{1 - (1+k)C_{310}^2 s_{310}^2}} + A_4 s_{310}^4 + A_6 s_{310}^6 + A_8 s_{310}^8 + A_{10} s_{310}^{10} + A_{12} s_{310}^{12},$$

$Z_{310}$ is the sag of the light receiving surface 301 in the direction of the light axis 301;

$C_{310}$ is the reciprocal of the value of the radius of curvature of the light receiving surface 310 at a position close to the light axis 301;

$s_{310}$ is the height from the light axis 301 to the light receiving surface 310, k is a conic coefficient, wherein k is less than or equal to −2.65;

$A_4$, $A_6$, $A_8$, $A_{10}$, and $A_{12}$ are respectively $4^{th}$, $6^{th}$, $8^{th}$, $10^{th}$, and $12^{th}$ order aspheric coefficient.

For example, $Z'_{310}$ is the sag of floating image generation unit 300 at the position 310' of the light receiving surface 301 in the direction of the light axis 301, $s'_{310}$ is the height at the position 310' of the light receiving surface 301 from the light axis 301 to the light receiving surface 310, $C'_{310}$ is the reciprocal of the value of the radius of curvature of the light receiving surface 310 at the position 310' of the light receiving surface 301. More particularly, the above aspheric function can reach the order of 12 in general. However, the difficulty of machining gets higher with the order number. Therefore, to optimize the design or manufacturing process, one can determine the order number to be optimized in accordance with the pixel correction effect or the cost. Preferably, but not limited to, selecting the $4^{th}$ order coefficient to be optimized.

The light emitting surface 320 is represented by the following function:

$$Z_{320}(s_{320}) = \frac{C_{320}s_{320}^2}{1+\sqrt{1-(1+k)C_{320}^2 s_{320}^2}} +$$
$$A_4 s_{320}^4 + A_6 s_{320}^6 + A_8 s_{320}^8 + A_{10} s_{320}^{10} + A_{12} s_{320}^{12},$$

$Z_{320}$ is the sag of the light emitting surface 320 in the direction of the light axis 301;

$C_{320}$ is the reciprocal of the value of the radius of curvature of the light emitting surface 320 at a position close to the light axis 301;

$S_{320}$ is the height from the light axis 301 to the light receiving surface 320;

k is a conic coefficient, wherein k is less than −1.5;

$A_4, A_6, A_8, A_{10}$, and $A_{12}$ are respectively $4^{th}, 6^{th}, 8^{th}, 10^{th}$, and $12^{th}$ order aspheric coefficient.

The radius of curvature of the floating image generation unit 300 is affected by the refractive index of the material. More particularly, the relationship between the radius of curvature of the floating image generation unit 300 and the refractive index of the material is represented by the following function:

$$\frac{1}{f} = (n-1)\left[\frac{1}{R_1} - \frac{1}{R_2} + \frac{(n-1)2d}{nR_1 R_2}\right],$$

wherein f is the focus length, n is the refractive index, $R_1$ is the radius of curvature of a first curvature, $R_2$ is the radius of curvature of a second curvature, and d is the thickness of a lens.

Accordingly, specific materials, such as polycarbonate, can be used in accordance with the design or manufacturing requirement.

An optical simulation software (Zemax, USA) was used for simulation, wherein $S_{200}$ is the surface of the displayed image of the image generation unit 200, $S_{400}$ is the aperture diaphragm 400, $S_{310}$ is the surface of the light receiving surface 310, $S_{320}$ is the surface of the light emitting surface 320, and $S_{500}$ is the real image 500. An interval is the straight-line distance between adjacent surfaces on the light axis 301. For example, the interval of the surface $S_{200}$ is the straight-line distance between the surface $S_{200}$ and the surface $S_{400}$ on the light axis 301. The simulation result is listed in the following Tables.

TABLE 1

Embodiment 1

| surface | radius of curvature (mm) | interval (mm) | material | conic coefficient | $4^{th}$ order aspheric coefficient |
|---|---|---|---|---|---|
| $S_{200}$ | infinite | infinite | | | |
| $S_{400}$ | infinite | 0 | | | |
| $S_{310}$ | −0.11673 | 0.10587 | PC | −2.98820305 | −0.91338276 |
| $S_{320}$ | 0.27958 | 0.3 | PC | −3.842883 | |
| $S_{500}$ | infinite | | | | |

The field-of-view angle θ is 80°.

TABLE 2

Embodiment 2

| surface | radius of curvature (mm) | interval (mm) | material | conic coefficient | $4^{th}$ order aspheric coefficient |
|---|---|---|---|---|---|
| $S_{200}$ | infinite | infinite | | | |
| $S_{400}$ | infinite | 0 | | | |
| $S_{310}$ | −0.12065 | 0.0879 | PC | −5.132815 | −3.1932 |
| $S_{320}$ | 0.222084 | 0.3 | PC | −2.298651 | |
| $S_{500}$ | infinite | | | | |

The field-of-view angle θ is 80°.

TABLE 3

Comparison Example

| surface | radius of curvature (mm) | interval (mm) | material | conic coefficient | $4^{th}$ order aspheric coefficient |
|---|---|---|---|---|---|
| $S_{200}$ | infinite | infinite | | | |
| $S_{400}$ | infinite | 0 | | | |
| $S_{310}$ | −0.21 | 0.11503 | PC | −2.65 | |
| $S_{320}$ | 0.21 | 0.3 | PC | −2.65 | |
| $S_{500}$ | infinite | | | | |

The field-of-view angle θ is 60°.

It can be seen in the results of Tables 1 to 3 that, compared to the field-of-view angle θ of 60° of the example for comparison, which has the same radius of curvature on both sides of the image generation unit, the field-of-view angle θ of 80° of the present disclosure, of which the absolute value of the radius of curvature of the light receiving surface at a position close to the light axis is smaller than the absolute value of the radius of curvature of the light emitting surface at a position close to the light axis, is clearly better. More particularly, the larger the field-of-view angle θ, then the smaller the focal length, the smaller the radius of curvature with respect to $S_{310}$ (i.e., the surface of the light receiving surface), and the larger the corresponding conic coefficient, making the light from the light receiving surface reach the light emitting surface easier. On the other hand, the smaller the refractive index, the weaker the focusing ability, which then requires a smaller radius of curvature, wherein the conic coefficient corresponding to $S_{310}$ (i.e. the surface of the light receiving surface) is larger.

Figure 4A:
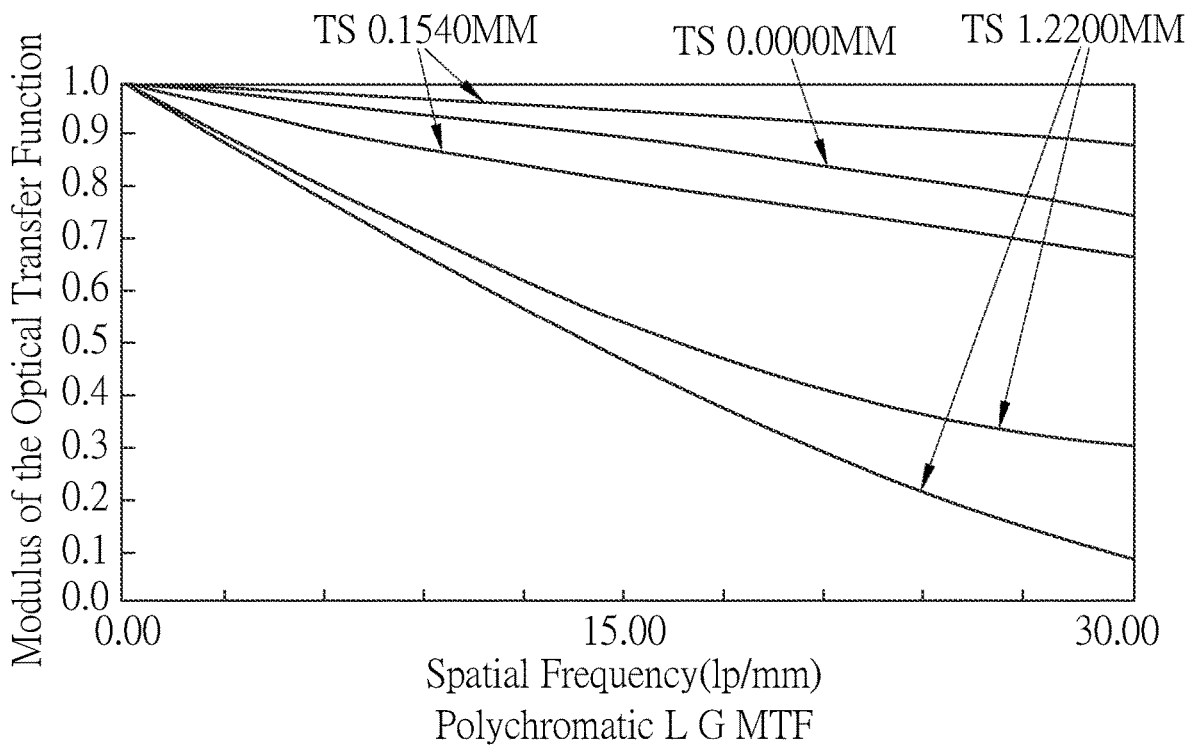
FIGS. 4A, 4B, and 4C are respectively modulation transfer function (MTF) curves of embodiments 1, 2, and a comparison example.
Figure 4B:
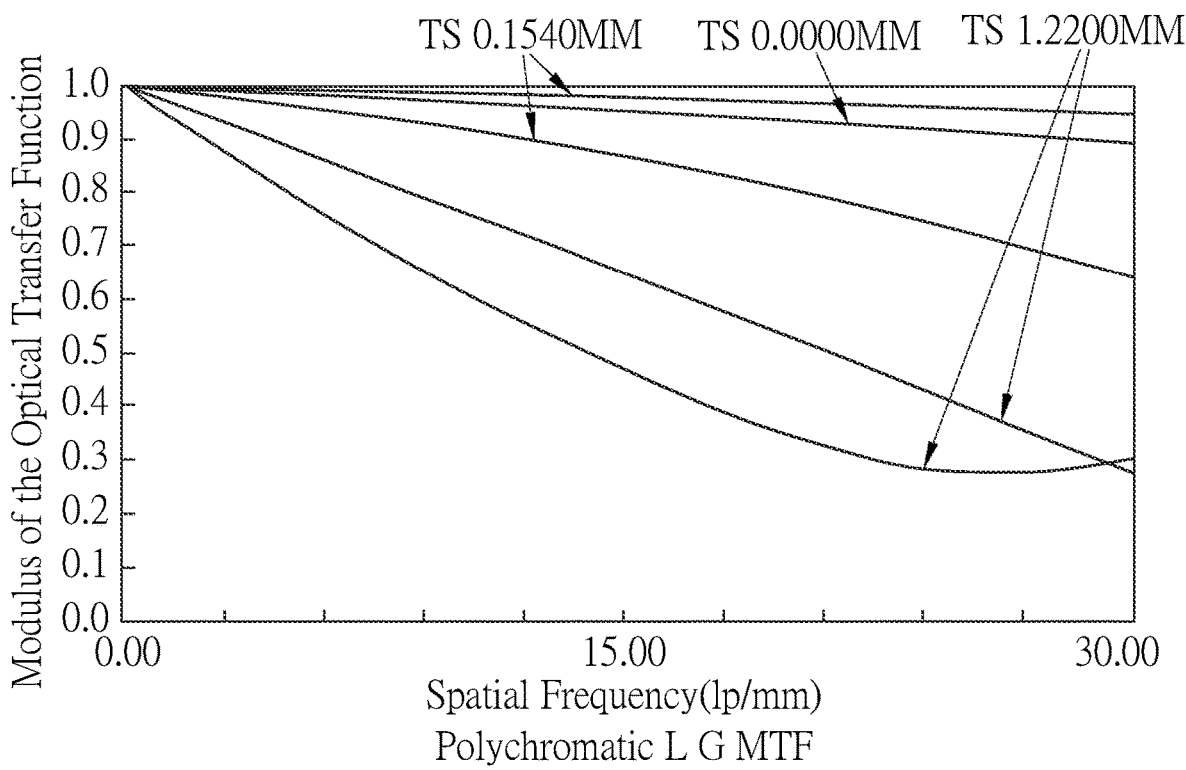
Figure 4C:
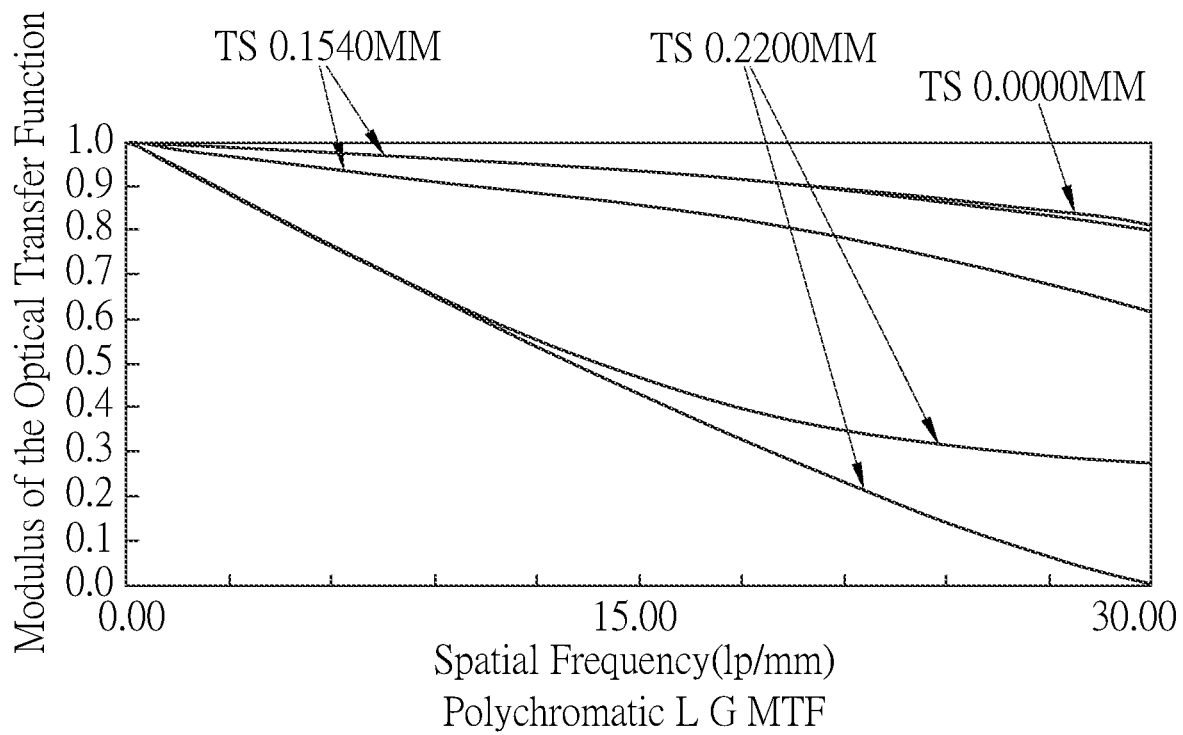

FIGS. 4A, 4B, and 4C are respectively modulation transfer function (MTF) curves of Embodiments 1, 2, and the example for comparison, wherein geometrical MTF and a spatial frequency of 30 lp/mm are used. For a spatial frequency of 30 lp/mm, in the on-axis and 0.7 off-axis fields, the MTF values are all larger than 30%. In the 1.0 field, Embodiment 1 and Embodiment 2 both match the conventional example, and the MTF values in the 1.0 field are both larger than that of the conventional example. Accordingly, the optical quality of Embodiment 1 and Embodiment 2 having a 80° field-of-view angle match the optical quality of the conventional example having a 59° field-of-view angle.

The present disclosure is described by means of the above-described relevant embodiments. However, the above-described embodiments are only examples for implementing the present disclosure. It should be pointed out that the disclosed embodiments do not limit the scope of the present disclosure. In contrast, the spirit included in the scope of the patent application and modifications and equivalent settings made within the scope are all included in the scope of the present disclosure.

What is claimed is:

1. An image generating module, comprising:
an image generation unit;
a floating image generation unit having a light axis disposed parallelly on one side of the image generation unit, wherein the floating image generation unit includes a light receiving surface and a light emitting surface disposed opposite to each other, wherein the light receiving surface faces the image generation unit, wherein the image generation unit provides an output light for generating a real image outside the light emitting surface, wherein the absolute value of the radius of curvature of the light receiving surface at a position close to the light axis is smaller than the absolute value of the radius of curvature of the light emitting surface at a position close to the light axis;
wherein the real image is visible when it is outside the light emitting surface and has a field-of-view angle more than or equal to 60° with respect to the light axis.

2. The image generating module according to claim 1, wherein the real image is visible when it is outside the light emitting surface and has a field-of-view angle equal to 80° with respect to the light axis.

3. The image generating module according to claim 1, wherein the light receiving surface is represented by the following function:

$$Z_r(s_r) = \frac{C_r s_r^2}{1+\sqrt{1-(1+k)C_r^2 s_r^2}} + A_4 s_r^4 + A_6 s_r^6 + A_8 s_r^8 + A_{10} s_r^{10} + A_{12} s_r^{12},$$

$Z_r$ is the sag of the light receiving surface in the direction of the light axis;
$C_r$ is the reciprocal of the value of the radius of curvature of the light receiving surface at a position close to the light axis;
$s_r$ is the height from the light axis to the light receiving surface;
k is a conic coefficient, wherein k is less than or equal to −2.65;
$A_4, A_6, A_8, A_{10}$, and $A_{12}$ are respectively $4^{th}, 6^{th}, 8^{th}, 10^{th}$, and $12^{th}$ order aspheric coefficient.

4. The image generating module according to claim 3, wherein k is larger than −20 and less than −2.65.

5. The image generating module according to claim 1, wherein the light emitting surface is represented by the following function:

$$Z_e(s_e) = \frac{C_e s_e^2}{1+\sqrt{1-(1+k)C_e^2 s_e^2}} + A_4 s_e^4 + A_6 s_e^6 + A_8 s_e^8 + A_{10} s_e^{10} + A_{12} s_e^{12},$$

$Z_e$ is the sag of the light emitting surface in the direction of the light axis;
$C_e$ is the reciprocal of the value of the radius of curvature of the light emitting surface at a position close to the light axis;
$s_e$ is the height from the light axis to the light receiving surface;
k is a conic coefficient, wherein k is less than −1.5;
$A_4, A_6, A_8, A_{10}$, and $A_{12}$ are respectively $4^{th}, 6^{th}, 8^{th}, 10^{th}$, and $12^{th}$ order aspheric coefficient.

6. The image generating module according to claim 5, wherein k is larger than −20 and less than −2.65.

7. The image generating module according to claim 1, wherein the relationship between the radius of curvature of the floating image generation unit and the refractive index of the material of the floating image generation unit is represented by the following function:

$$\frac{1}{f} = (n-1)\left[\frac{1}{R_1} - \frac{1}{R_2} + \frac{(n-1)2d}{nR_1R_2}\right],$$

f is the focus length,
n is the refractive index,
$R_1$ is the radius of curvature of a first curvature,
$R_2$ is the radius of curvature of a second curvature,
d is the thickness of a lens.

8. A floating image generation device, comprising:
a light source; and
the image generating module according to claim 1, wherein the floating image generation unit is disposed parallelly on the opposite side of the image generation unit with respect to the light source, wherein the light emitted by the light source passes through the image generation unit to form the output light for generating the real image.

9. The floating image generation device according to claim 8, wherein the real image is visible when it is outside the light emitting surface and has a field-of-view angle equal to 80° with respect to the light axis.

10. The floating image generation device according to claim 8, wherein the light receiving surface is represented by the following function:

$$Z_r(s_r) = \frac{C_r s_r^2}{1+\sqrt{1-(1+k)C_r^2 s_r^2}} + A_4 s_r^4 + A_6 s_r^6 + A_8 s_r^8 + A_{10} s_r^{10} + A_{12} s_r^{12},$$

$Z_r$ is the sag of the light receiving surface in the direction of the light axis;
$C_r$ is the reciprocal of the value of the radius of curvature of the light receiving surface at a position close to the light axis;
$s_r$ is the height from the light axis to the light receiving surface;
k is a conic coefficient, wherein k is less than or equal to −2.65;
$A_4, A_6, A_8, A_{10}$, and $A_{12}$ are respectively $4^{th}, 6^{th}, 8^{th}, 10^{th}$, and $12^{th}$ order aspheric coefficient.

11. The floating image generation device according to claim 10, wherein k is larger than −20 and less than −2.65.

12. The floating image generation device according to claim 8, wherein the light emitting surface is represented by the following function:

$$Z_e(s_e) = \frac{C_e s_e^2}{1+\sqrt{1-(1+k)C_e^2 s_e^2}} + A_4 s_e^4 + A_6 s_e^6 + A_8 s_e^8 + A_{10} s_e^{10} + A_{12} s_e^{12},$$

$Z_e$ is the sag of the light emitting surface in the direction of the light axis;

$C_e$ is the reciprocal of the value of the radius of curvature of the light emitting surface at a position close to the light axis;

$s_e$ is the height from the light axis to the light receiving surface;

k is a conic coefficient, wherein k is less than −1.5;

$A_4, A_6, A_8, A_{10},$ and $A_{12}$ are respectively $4^{th}, 6^{th}, 8^{th}, 10^{th},$ and $12^{th}$ order aspheric coefficient.

13. The floating image generation device according to claim 12, wherein k is larger than −20 and less than −2.65.

14. The floating image generation device according to claim 8, wherein the relationship between the radius of curvature of the floating image generation unit and the refractive index of the material of the floating image generation unit is represented by the following function:

$$\frac{1}{f} = (n-1)\left[\frac{1}{R_1} - \frac{1}{R_2} + \frac{(n-1)2d}{nR_1R_2}\right],$$

f is the focus length, n is the refractive index, $R_1$ is the radius of curvature of a first curvature, $R_2$ is the radius of curvature of a second curvature, d is the thickness of a lens.

* * * * *